United States Patent [19]

Coffman

[11] Patent Number: 4,629,596

[45] Date of Patent: Dec. 16, 1986

[54] NON DELAMINATING REGRIND

[75] Inventor: Paul M. Coffman, Houston, Tex.

[73] Assignee: Shell Oil Company, Houston, Tex.

[21] Appl. No.: 606,050

[22] Filed: May 2, 1984

[51] Int. Cl.$^4$ .............. B29C 63/00; B32B 27/08; B32B 31/30

[52] U.S. Cl. .................... 264/171; 524/425; 524/456; 524/436; 524/503; 264/37; 264/DIG. 69; 428/516

[58] Field of Search .............. 428/516; 524/436, 456, 524/425; 264/171, 37, DIG. 69

[56] References Cited

U.S. PATENT DOCUMENTS

| | | | |
|---|---|---|---|
| 3,775,521 | 11/1973 | Yamamoto et al. | 264/171 |
| 3,806,562 | 4/1974 | Lamort et al. | 264/DIG. 43 |
| 3,933,731 | 1/1976 | Machi et al. | 524/436 |
| 4,046,945 | 9/1977 | Baxmann et al. | 524/425 |
| 4,094,854 | 6/1978 | Harada et al. | 524/456 |
| 4,230,767 | 10/1980 | Isaka et al. | 428/516 |
| 4,425,410 | 1/1984 | Farrell et al. | 428/516 |
| 4,430,468 | 2/1984 | Schumacher | 524/425 |
| 4,451,512 | 5/1984 | Yazaki et al. | 428/516 |

FOREIGN PATENT DOCUMENTS

| | | | |
|---|---|---|---|
| 2144536 | 3/1972 | Fed. Rep. of Germany | 264/DIG. 69 |
| 49-12574 | 3/1974 | Japan | 524/456 |

OTHER PUBLICATIONS

Chem. Abstracts vol. 67 entry 44312r.

*Primary Examiner*—Joseph L. Schofer
*Assistant Examiner*—Peter F. Kulkosky
*Attorney, Agent, or Firm*—Jennifer R. Ross

[57] ABSTRACT

A regrind layer which comprises polypropylene, ethylenevinyl alcohol, adhesive and inorganic mineral filler which disperses within the regrind layer to prevent delamination within the regrind.

9 Claims, 1 Drawing Figure

NON DELAMINATING REGRIND

BACKGROUND OF THE INVENTION

The present invention provides for an article which is formed from sheet made by coextrusion of layers of ethylenevinyl alcohol (EVOH), adhesive, polypropylene or other polyolefins such as polypropylene, high density polyethylene, polyethylene and copolymers of polypropylene/polyethylene, or polystyrene and a reground blend of ethylenevinyl alcohol, adhesive, polypropylene and inorganic mineral filler which disperses within the regrind. More particularly, this invention refers to formation of articles such as plastic cups thermoformed from sheets made by coextrusion of the above-mentioned layers of materials in such a way and combination so that delamination of the regrind layers does not occur, and is directed preferably to the unique regrind composition.

Heretofore, extruded polyolefins sheets have been subject to problems of delamination or separation within layers. Delamination has the adverse effects of (a) unsightly defects, (b) loss of part stiffness and (c) loss of impact resistance. Typical, for example, is regrind which contains scrap of polypropylene, ethylenevinyl alcohol and adhesive. Such typical regrind has materials of both high and low viscosity, which tend to separate when subjected to shear forces such as those encountered in a sheeting or film die. The ethylenevinyl alcohol at high shear rates is of higher viscosity than other components and tends to move toward the center of the layer. Such delamination is highly undesirable for articles formed from coextruded sheets of polyolefin layers where increased longevity of the formed articles is desired. In many cases, as with the use of ethylenevinyl alcohol, delamination of the coextruded material layers occurs during forming and/or during flexing while in use before the desired lifetime of the product has expired.

Multilayer sheet containing a layer of oxygen barrier polymer such as EVOH (EVAL ®) as well as layers of adhesive and less expensive polyolefins are being commercially thermoformed into food containers for use in storing shelf stable oxygen sensitive foods. When the parts are formed the unused web of sheet usually represents 30–50% of the sheet fed and must be recovered for reuse. It has been found that this scrap upon regrinding and reextrusion forms a sheet which delaminates too readily upon flexing. This is believed due to a phase separation of the incompatible polar EVOH and nonpolar polyolefins in the high shear field inside the sheeting die. This delamination leads to unsightly discontinuities in the formed parts and to loss of stiffness and impact resistance of the parts.

A coextruded material should have an even, uniform output with no surging, have a color suitable to the end use product, and have no recognizably offensive odor. This invention also provides for a method by which the viscosities of the various materials are compatabilized to a similar viscosity range. Some reduction of delamination can be accomplished by use of a dispersing aid, but at the expense of offensive odors and die lip material buildup problems.

The present invention provides for a regrind layer which comprises polypropylene of other polyolefins, ethylenevinyl alcohol, adhesive and an amount of an inorganic mineral filler which will disperse within the regrind to give the coextruded sheet good lamination properties.

In particular, the regrind layer comprises from about 50% by weight to about 95% by weight polypropylene, from about 2% by weight to about 40% by weight ethylenevinyl alcohol, from about 5% by weight to about 40% by weight adhesive and from about 20% by weight to about 60% by weight inorganic mineral filler.

The regrind layer composition is unique in that the inclusion of inorganic mineral filler such as calcium carbonate ($CaCO_3$) or talc ($CaSiO_3$) works with the polypropylene, ethylenevinyl alcohol and adhesive to prevent internal delamination in the regrind layer.

DRAWINGS

FIG. 1 shows the coextruded sheet composition, including the regrind layer, of the claimed article.

DETAILED DESCRIPTION OF THE INVENTION

Figure 1:
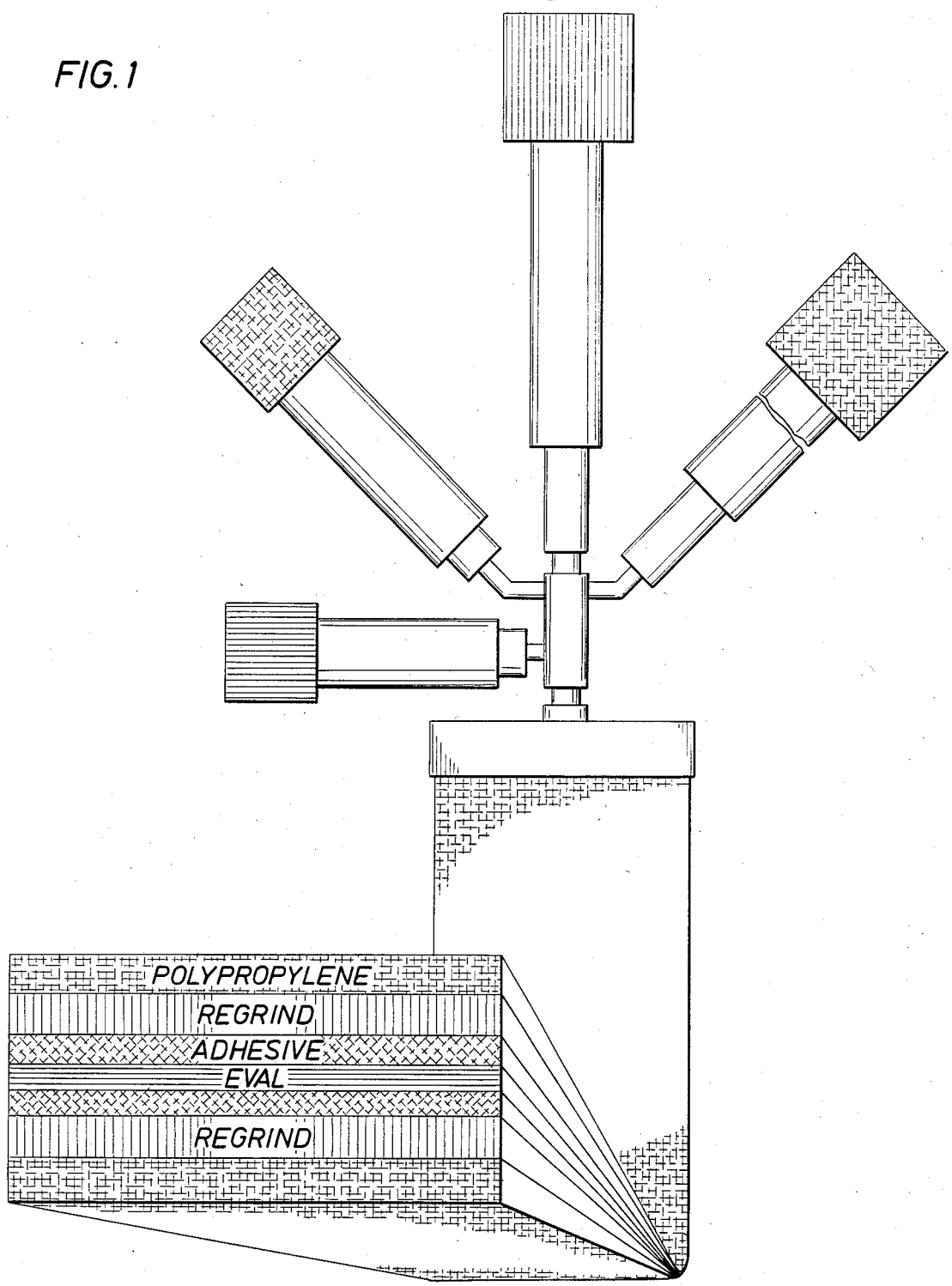

This invention also provides for an article which is formed by coextrusion of layers comprising a layer of ethylenevinyl alcohol, a layer of an adhesive on both side of the ethyleneviny alcohol layer, a layer of either regrind or polypropylene on at least one side of the adhesive layer, and another layer of either regrind or polypropylene on at least one side of that layer. In the event it is desired to contain a high moisture content material, the regrind should be at least on the side of the formed article which will come into contact with the high moisture content material.

In this embodiment, the ethylenevinyl alcohol layer could comprise from about 0% by weight to about 25% by weight, the adhesive layer comprising from about 0% by weight to about 10% by weight, the polypropylene layers comprising from about 0% by weight to about 95% by weight and the regrind layer comprising from about 5% by weight to about 95% by weight.

The regrind layer in particular would comprise from about 50% by weight to about 95% by weight polypropylene or other polyolefin, from about 2% by weight to about 40% by weight ethylenevinyl alcohol, from about 5% by weight to about 40% by weight adhesive and from about 20% by weight to about 60% by weight inorganic mineral filler such as $CaCO_3$ or $CaSiO_3$ but not limited to such fillers.

The ethylenevinyl alcohol layer comprises preferably from about 5% by weight to about 15% by weight ethylenevinyl alcohol and more preferably about 10% by weight ethylenevinyl alcohol. The adhesive layer comprises preferably from about 3% by weight to about 7% by weight adhesive and more preferably about 5% by weight adhesive. The polypropylene layer comprises preferably from about 30% by weight to about 60% by weight polypropylene and more preferably about 50% by weight polypropylene. The regrind layer comprises preferably from about 50% by weight to about 95% by weight and most preferably about 70% by weight.

Within the regrind layer polypropylene comprises preferably from about 60% by weight to about 80% by weight and most preferably about 70% by weight polypropylene. Within the regrind the ethylenevinyl alcohol comprises preferably from about 15% by weight to about 25% by weight ethylenevinyl alcohol and most preferably about 20% by weight ethylenevinyl alcohol. The regrind comprises preferably from about 15% by weight to about 25% by weight adhesive and most preferably from about 20% by weight adhesive, and preferably from about 20% by weight to about 40% by weight inorganic mineral filler and most preferably about 30% by weight inorganic mineral filler.

The inorganic mineral filler should be selected among inorganic mineral fillers which will evenly disperse among the polypropylene, ethylenevinyl alcohol, and adhesive of the regrind layer in order to give the present invention its unique properties. The inorganic mineral filler may be calcium carbonate ($CaCO_3$) or talc ($CaSiO_3$) or another suitable inorganic mineral filler which will disperse relatively evenly within the regrind layer.

The adhesive may be any suitable adhesive in the amount specified but is preferably selected from the group of EVA's, ionomers, thermoplastic rubbers such as KRATON®, available from Shell Development Company, Houston, Tex. and, preferably, polypropylene or polyethylene modified with polar compounds such as maleic anhydride or acrylic acid.

The adhesive may be bonded on either side of the EVAL layer. Either regrind or polypropylene is bonded to the adhesive layer. The outer layer is polypropylene bonded to the regrind, or if polypropylene was used first, the outer layer is regrind, which is bonded to the polypropylene. The regrind layer need only be on one side of the container. The virgin polypropylene layer need not be present especially if a gloss is not needed. Alternatively, the ethylenevinyl alcohol layer need not be the innermost layer but may be an intermediate or surface layer.

EXAMPLE 1

As shown in Table 1 below, a scrap control was prepared from dry blended 64% by weight polypropylene 5524, 18% by weight ethylenevinyl alcohol (EVAL® E, from Kurraray of Japan) and 18% by weight Plexar 2110 adhesive, from Chemplex. Each of these was dry tumbled as pellets. Mixing should be processed at 150 rpm with a one stage mixing screw, a barrel profile of 470-470-420-420, a die of 400° F. Single Stage screws may be used, which can be desirably designed by looking at rheological curves. It may be seen in Table 1 that the expected undesirable delamination occurred when the blend was converted into sheet by conventional sheet extrusion onto a three roll cooling stack.

TABLE 1

| COMPOSITION OF SCRAP CONTROL | | |
|---|---|---|
| %, by weight | Composition | Free of Delamination |
| 64 | PP 5524 | No |
| 18 | EVAL E | |
| 18 | PLEXAR 2110 | |

EXAMPLE 2

Table 2 shows the compositions of various scrap blends and delamination test results which were prepared in accordance with the above method. Each of the formulations in Table 2 represent potential compatiblizers which were dry blended with the scrap and sheeted on a 1¼" Killian extruder. Formulation No. 1 contained $CaCO_3$. Formulation Nos. 2–8 did not contain any $CaCO_3$. Formulation No. 1 contains 62% by weight scrap, 38% by weight WBS 139, from Shell Chemical Co. (with a calcium carbonate level of 30%). WBS 139 contans 80% by weight $CaCO_3$ in polybutylene. An advantage in the use of the $CaCO_3$ in such a medium is that polybutylene can absorb more $CaCO_3$ filler than can polypropylene (50%) for example,—up to 80% $CaCO_3$ in the polybutylene. Formulation No. 1 was free of delamination.

However, none of Formulations Nos. 2–8 still delaminated. Formulation No. 6 showed some slight improvement with use of OTB®, a dispersing agent available from American Cyanamid, however, an intense odor and undesirable die lip build-up occurred, rendering Formulation No. 6 unsuitable for compatibilization within the scrap.

TABLE 2

| DELAMINATION OF PARTICULAR SCRAP BLENDS | | | |
|---|---|---|---|
| FORMULATION NUMBER | COMPOSIITON | %, BY WEIGHT | FREE OF DELAMINATION |
| 1 | Scrap | 62 | YES |
| | WBS 139 | 38 | |
| | ($CaCO_3$ level = 30%) | | |
| 2 | Scrap | 80 | NO |
| | KRATON GX 2705 | 20 | |
| 3 | Scrap | 85 | NO |
| | KRATON DX 1300 | 15 | |
| 4 | Scrap | 85 | NO |
| | KRATON GX 1855 | 15 | |
| 5 | Scrap | 80 | NO |
| | BLACK CONC. 9581 | 20 | |
| 6 | Scrap | 90 | SOME IMPROVEMENT, BUT ODOR AND DIE LIP BUILD-UP PROBLEMS |
| | OTB | 10 | |
| 7 | Scrap | 99 | NO |
| | OTB | 1 | |
| 8 | Scrap | 99 | NO |
| | PB 8010 | 1 | |

*WBS 139 = 20% PB, 80% $CaCO_3$

EXAMPLE 3

Scrap blends containing various amounts of $CaCO_3$ were tested for delamination. Compositions ranged from 0% by weight $CaCO_3$ in control Formulation No. 1 to 40% by weight $CaCO_3$ in Formulation No. 7. It may be noted from Table 3 that delamination occurred up to, and including, Formulation No. 4, which formulation contained 15% by weight $CaCO_3$. Formulation Nos. 5, 6 and 7 which contained 20%, 20% and 40% by weight $CaCO_3$, respectively, were free of delamination, however. This indicates that an amount of $CaCO_3$ of more than 15% by weight will prevent delamination.

Note that the Multiflex ® CaCO3, made by Pfizer, is a different grade of calcium carbonate which consists of finer particle size. The barrel profile for Formulation Nos. 1 through 7 was 450-470-420-420, the die was 420° F. and rpm was 150. WBS 139 is 20% polybutylene and 80% CaCo3.

TABLE 3

DELAMINATION OF SCRAP BLENDS CONTAINING CaCO3

| NUMBER | COMPOSITION | %, BY WEIGHT | % BY WEIGHT CaCO3 | FREE OF DELAMINATION |
|---|---|---|---|---|
| 1 | PP 5524 | 64.0 | 0.0 | NO |
|   | EVAL E | 18.0 |   |   |
|   | PLEXAR 2110 | 18.0 |   |   |
| 2 | Scrap | 93.7 | 5.0 | NO |
|   | *WBS 139 | 6.3 |   |   |
| 3 | Scrap | 87.5 | 10.0 | NO |
|   | WBS 139 | 12.5 |   |   |
| 4 | Scrap | 81.0 | 15.0 | NO |
|   | WBS 139 | 19.0 |   |   |
| 5 | Scrap | 75.0 | 20.0 | YES |
|   | WBS 139 | 25.0 |   |   |
| 6 | Scrap | 50.0 | 20.0 | YES |
|   | Multiflex ® CaCO3 | 50.0 |   |   |
| 7 | Scrap | 50.0 | 40.0 | YES |
|   | WBS 139 | 50.0 |   |   |

*WBS 130 = 20% PB, 80% CaCO3

Titanium oxide TiO2 in polypropylene as a white concentrate may be added to the scrap calcium carbonate blend to give the blend a good appearance. Such addition of titanium oxide in polypropylene, for example, may be added to the scrap calcium carbonate blend without affecting the freedom from delamination characteristic of this invention.

EXAMPLE 4

Table 4, below, reveals delamination tests of scrap blends which contain a different inorganic mineral filler—talc (CaSiO3). Formulation 1 is a dry blend of 50% by weight scrap (74% polypropylene 5524, 18% Plexar ® and 18% EVAL E ®), and 50% by weight of 40% talc in polypropylene.

The 40% talc in polypropylene may be obtained for example from Washington Penn Plastics. The blend was sheeted on a 1¼" Killian extruder using a two-stage mixing screw and a 200 mesh screen pack. The blends were evaluated at 450° F., 150 rpm and a melt of 434.

TABLE 4

DELAMINATION OF SCRAP BLENDS CONTAINING TALC

| NUMBER | COMPOSITION | %, BY WEIGHT | % BY WEIGHT TALC | FREE OF DELAMINATION |
|---|---|---|---|---|
| 1 | *Scrap | 50.0 | 20.0 | YES |
|   | 40% talc in PP | 40.0 |   |   |
| 2 | EVAL E | 18.0 | 25.0 | YES |
|   | Plexar 2110 | 18.0 |   |   |
|   | 40% talc in PP | 64.0 |   |   |

*Scrap = 74% PP 5524, 18% Plexar and 18% EVAL E

As seen in Table 4, Formulation No. 1, which contained 20% by weight talc, did not delaminate. Formulation No. 2, which contained 25% by weight talc, likewise did not laminate.

Thus, it is apparent that the use of an inorganic mineral filler relatively evenly dispersed within a layer, such as a layer of regrind scrap, unexpectedly prevents delamination from occurring. Thus formed articles may be successfully extruded with assurance of much longer lifetimes than heretofore anticipated or experienced, without the problem of delamination. The regrind layer which contains the inorganic mineral filler may vary in compositon, and may be used in combination with other various layers which may be extruded with the regrind layer. Apparently a viscosity and sheer rate change by the mineral filler prevents separation and splitting with the ethylenevinyl alcohol.

Deviations in materials and methods from the above will be obvious to those skilled in the art.

What is claimed is:

1. A regrind composition comprising:
   from about 50% by weight to about 93% by weight polypropylene, from about 2% by weight to about 40% by weight ethylenevinyl alcohol, from about 5% by weight to about 40% by weight adhesive, and from about 20% by weight to about 95% by weight inorganic mineral filler of the total amount of said ethylenevinyl alcohol, said polypropylene and said adhesive to prevent delamination.

2. The regrind of claim 1, wherein:
   said regrind comprises from about 60% by weight to about 80% by weight polypropylene, from about 15% by weight to about 25% by weight ethylenevinyl alcohol, from about 15% by weight to about 25% by weight adhesive, and from about 20% by weight to about 40% by weight inorganic mineral filler.

3. The regrind of claim 2 wherein said inorganic mineral filler is CaCO3 or CaSiO3.

4. A regrind composition, said regrind composition comprising:
   from about 60% by weight to about 80% by weight polypropylene, from about 15% by weight to about 25% by weight ethylenevinyl alcohol, from about 15% by weight to about 25% by weight adhesive, and from about 20% by weight to about 40% by weight inorganic mineral filler of the total amount of said ethylenevinyl alcohol, said polypropylene and said adhesive to prevent delamination.

5. The regrind of claim 4 wherein said inorganic mineral filler is CaCO3 or CaSiO3.

6. The regrind of claim 4, wherein:
   said adhesive is selected from the group of ethylenevinyl alcohols, ionomers, thermoplastic rubbers, and polypropylenes and polyethylenes modified with polar compounds such as maleic anhydride.

7. A regrind composition, said regrind composition comprising about 70% by weight polypropylene, about 20% by weight ethylenevinyl alcohol, about 20% by weight maleic anhydride modified polyproplylene or polyethylene, and about 20% by weight CaCO3 or CaSiO3 of the total amount of said ethylenevinyl alcohol, said polypropylene and said modified polypropylene to prevent delamination.

8. A formed article, said article being formed by means of coextrusion of:
   a sheet of layers, said layers comprising an inner layer which comprises an inner sub-layer of about 10% by weight ethylenevinyl alcohol, an intermediate sub-layer of about 5% by weight adhesive, and outer sub-layer of about 15% by weight polypropylene and outer layer of regrind of which comprises about 50% by weight polypropylene, about 20% by weight ethylenevinyl alcohol, about 20% by weight adhesive and about 30% by weight CaCO$_3$ or CaSiO$_3$ of the total amount of said ethylenevinyl alcohol, said polypropylene and said adhesive to prevent delamination.

9. A method for making a formed article, comprising the steps of:
regrinding scrap sheet which contains polypropylene, ethylvinyl alcohol and adhesive;
adding to said scrap sheet regrind an inorganic mineral filler which will disperse with said regrind in an amount sufficient to prevent delamination between layers of said sheet from which said formed article is made;
coextruding said filler containing regrind with ethylenevinyl alcohol, adhesive, and polypropylene into a coextruded sheet; and
forming the desired article from said coextruded sheet.

* * * * *